United States Patent
Shigeta et al.

(10) Patent No.: US 12,075,512 B2
(45) Date of Patent: Aug. 27, 2024

(54) COMMUNICATION APPARATUS AND COMMUNICATION CONTROL METHOD TO CONTROL A COMMUNICATION INTERVAL FOR WIRELESS COMMUNICATION

(71) Applicant: SONY GROUP CORPORATION, Tokyo (JP)

(72) Inventors: Yu Shigeta, Tokyo (JP); Tetsu Eto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 334 days.

(21) Appl. No.: 17/310,612

(22) PCT Filed: Feb. 21, 2019

(86) PCT No.: PCT/JP2019/006638
§ 371 (c)(1),
(2) Date: Aug. 13, 2021

(87) PCT Pub. No.: WO2020/170396
PCT Pub. Date: Aug. 27, 2020

(65) Prior Publication Data
US 2022/0174778 A1 Jun. 2, 2022

(51) Int. Cl.
*H04W 76/28* (2018.01)
*H04W 4/38* (2018.01)

(52) U.S. Cl.
CPC ............. *H04W 76/28* (2018.02); *H04W 4/38* (2018.02)

(58) Field of Classification Search
CPC ........ H04M 1/00; H04M 11/00; Y02D 30/70; H04W 76/28; H04W 4/38; H04W 52/02; H04W 88/02
See application file for complete search history.

(56) References Cited

U.S. PATENT DOCUMENTS

2014/0274044 A1* 9/2014 Lee ........................ H04W 48/16
455/434
2017/0339640 A1* 11/2017 Krishnamoorthy .........................
H04W 52/0225

(Continued)

FOREIGN PATENT DOCUMENTS

CN 105009648 A 10/2015
EP 2974473 A1 1/2016

(Continued)

OTHER PUBLICATIONS

International Search Report (ISR), English translation of PCT/JP2019/006638, mailed Mar. 26, 2019 (Year: 2019).*

(Continued)

*Primary Examiner* — Benjamin H Elliott, IV
(74) *Attorney, Agent, or Firm* — CHIP LAW GROUP

(57) ABSTRACT

To provide a communication apparatus capable of dynamically changing a discontinuous reception cycle with use of sensor data. Provided is a communication apparatus including a wireless communication section configured to execute wireless communication with an outside and a control section configured to acquire environmental information including sensing data output from a sensor group and to dynamically control, on the basis of the environmental information, an interval of the wireless communication performed by the wireless communication section with the outside.

8 Claims, 12 Drawing Sheets

(56) References Cited

U.S. PATENT DOCUMENTS

| | | | | |
|---|---|---|---|---|
| 2018/0376417 | A1* | 12/2018 | Wang | H04W 52/0254 |
| 2019/0349858 | A1* | 11/2019 | Jantzi | H04W 76/28 |
| 2020/0104117 | A1* | 4/2020 | Ulen | G06F 8/654 |
| 2021/0152976 | A1* | 5/2021 | Daoura | H04W 52/0254 |
| 2021/0256833 | A1* | 8/2021 | Daoura | H04W 4/021 |
| 2022/0039046 | A1* | 2/2022 | Ianev | H04W 60/00 |
| 2022/0060373 | A1* | 2/2022 | Huang | H04L 41/0654 |
| 2022/0174778 | A1* | 6/2022 | Shigeta | H04W 76/28 |

FOREIGN PATENT DOCUMENTS

| | | |
|---|---|---|
| JP | 10-221426 A | 8/1998 |
| JP | 2010-028672 A | 2/2010 |
| JP | 2010-041155 A | 2/2010 |
| JP | 2011-023779 A | 2/2011 |
| JP | 2013-131197 A | 7/2013 |
| JP | 2016-090285 A | 5/2016 |
| JP | 2016-517669 A | 6/2016 |
| KR | 10-2015-0132233 A | 11/2015 |
| WO | 2010/010645 A1 | 1/2010 |
| WO | 2014/160007 A1 | 10/2014 |
| WO | 2017/200675 A1 | 11/2017 |

OTHER PUBLICATIONS

"Optimization of DRX Power Saving for LTE Based IOT Devices"; Muizz et al.; Department of Electrical and Electronic Engineering Islamic University of Technology (IUT) Gazipur, Bangladesh; Nov. 2017 (Year: 2017).*

"Grouping-Based Discontinuous Reception for Massive Narrowband Internet of Things Systems"; Xu et al.; IEEE Internet of Things Journal, vol. 5, No. 3, Jun. 2018 (Year: 2018).*

"Energy Modeling and Evaluation of NB-IoT with PSM and eDRX"; Sultania et al.; 2018 IEEE Globecom Workshops (GC Wkshps) (Year: 2018).*

International Search Report and Written Opinion of PCT Application No. PCT/JP2019/006638, issued on Mar. 26, 2019, 10 pages of ISRWO.

* cited by examiner

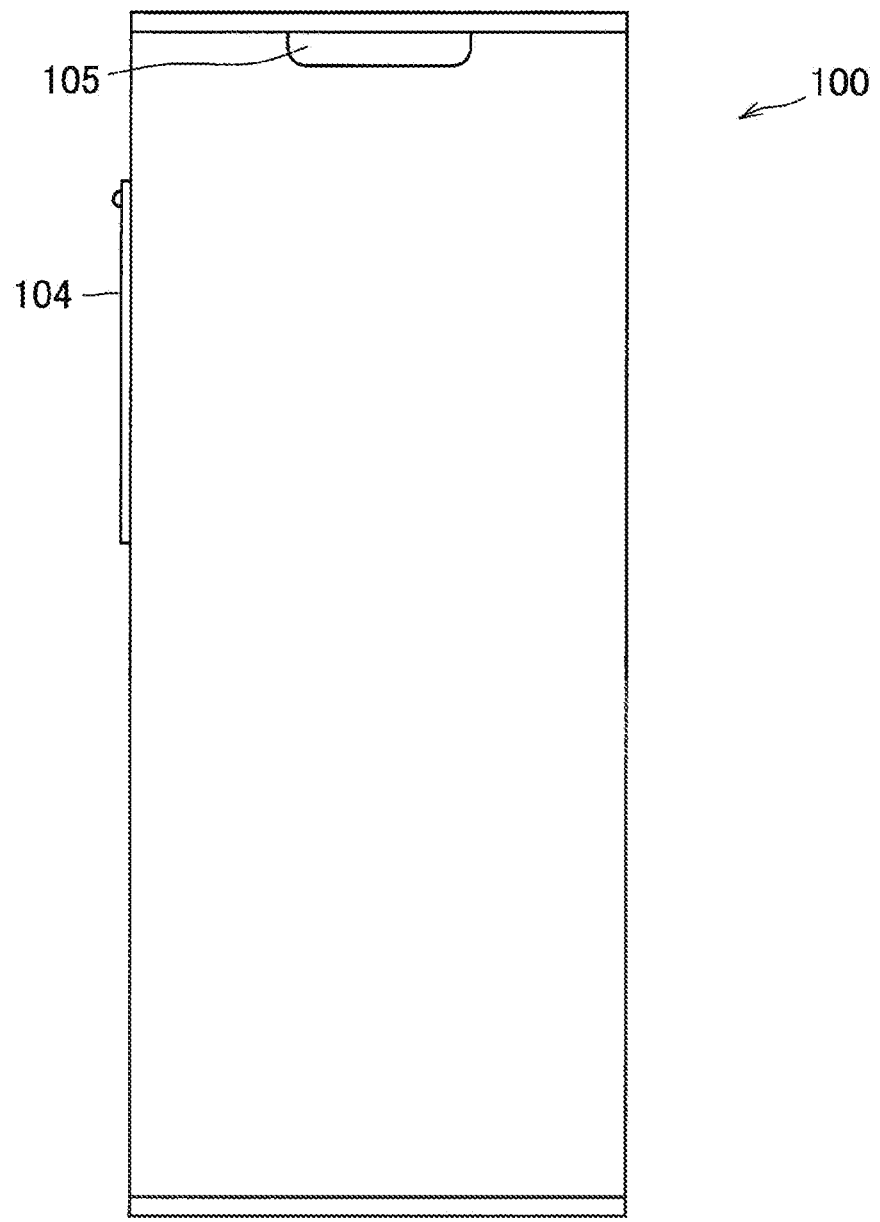

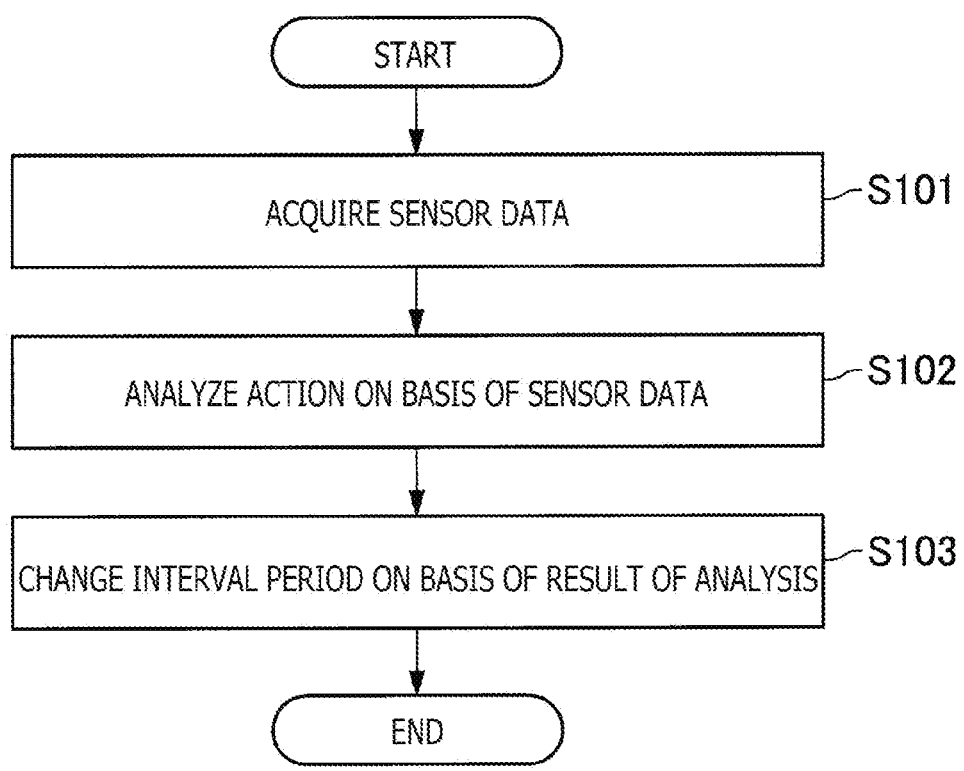

FIG.5A
ACTION ANALYSIS RESULT
  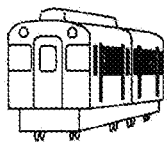  
Stay    Stay acc    Train    Stay acc           Walk
BLE
| BLE:Connected | BLE:Disconnected |
GPS
| HOME | | SCHOOL | PERFORMANCE |
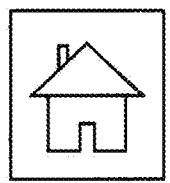        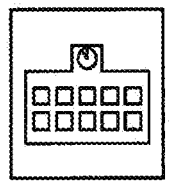 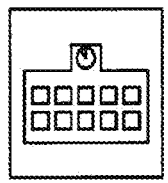 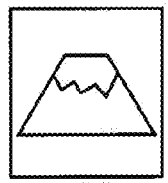
6:30 WAKE UP    7:00 EAT BREAKFAST    8:00 GO TO SCHOOL (WITH FATHER)    8:30 ARRIVE AT SCHOOL    8:30– TAKE CLASSES    11:30– GO ON PICNIC OUTSIDE SCHOOL
STATE OF CELLULAR COMMUNICATION SECTION
| PSM | Connected | Idle eDRX(mid) | Connected |

FIG.5B
ACTION ANALYSIS RESULT
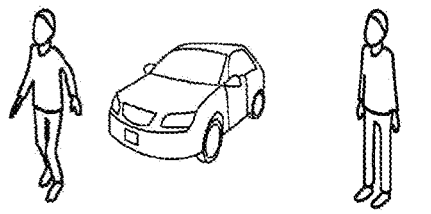
Walk　　Car　　Stay acc
BLE
BLE:Disconnected | BLE:Connected
GPS
SCHOOL | HOME
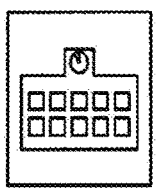 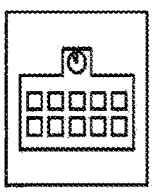 
14:00-　　16:00-　　18:00　　18:30　　19:30　　20:30-　　21:30
TAKE　　ENGAGE IN EXTRA-　LEAVE　RETURN　HAVE　READ　GO TO
CLASSES　CURRICULAR　SCHOOL　HOME　DINNER　BOOKS　SLEEP
　　　　　ACTIVITIES　(WITH
　　　　　　　　　　　FATHER)
STATE OF CELLULAR
COMMUNICATION SECTION
Idle
eDRX(short) | Connected | eDRX(long)

COMMUNICATION APPARATUS AND COMMUNICATION CONTROL METHOD TO CONTROL A COMMUNICATION INTERVAL FOR WIRELESS COMMUNICATION

CROSS REFERENCE TO RELATED APPLICATIONS

This application is a U.S. National Phase of International Patent Application No. PCT/JP2019/006638 filed on Feb. 21, 2019. Each of the above-referenced applications is hereby incorporated herein by reference in its entirety.

TECHNICAL FIELD

The present disclosure relates to a communication apparatus, a communication control method, and a computer program.

BACKGROUND ART

In recent years, communication apparatuses having a wireless communication function are becoming increasingly small and light. Making communication apparatuses having a wireless communication function smaller and lighter makes it difficult to increase the capacity of the battery to be mounted on the communication apparatuses. Thus, reduced power consumption is important for small and light communication apparatuses to be continuously usable for a longer period of time. For example, PTL 1 discloses a technology for a mobile phone aimed at making the mobile phone continuously usable for a longer period of time, by making a discontinuous reception cycle longer in a case where a positional relation satisfies predetermined conditions and thereby reducing power consumption.

CITATION LIST

Patent Literature

[PTL 1]
Japanese Patent Laid-open No. 2011-23779

SUMMARY

Technical Problems

As described above, further reduced power consumption is important for small and light communication apparatuses to be continuously usable for a longer period of time. On the other hand, simply making the discontinuous reception cycle longer makes it difficult to receive data in a timely manner.

Thus, the present disclosure proposes a novel and improved communication apparatus, communication control method, and computer program that are capable of dynamically changing the discontinuous reception cycle with use of sensor data.

Solution to Problems

According to the present technology, provided is a communication apparatus including a wireless communication section configured to execute wireless communication with an outside; and a control section configured to acquire environmental information including sensing data output from a sensor group and to dynamically control, on the basis of the environmental information, an interval of the wireless communication performed by the wireless communication section with the outside.

Further, according to the present disclosure, provided is a communication control method including, by a processor, executing wireless communication with an outside; and acquiring environmental information including sensing data output from a sensor group and dynamically controlling, on the basis of the environmental information, an interval of the wireless communication with the outside.

Further, according to the present disclosure, provided is a computer program causing a computer to execute wireless communication with an outside; and acquire environmental information including sensing data output from a sensor group and dynamically control, on the basis of the environmental information, an interval of the wireless communication with the outside.

BRIEF DESCRIPTION OF DRAWINGS

FIG. 1B is an explanatory diagram illustrating an example of the appearance of the communication apparatus 100 according to the embodiment of the present disclosure.

FIG. 4 is a flowchart illustrating an example of an operation of the communication apparatus 100 according to the embodiment of the present disclosure.

FIG. 5A is an explanatory diagram illustrating an example of a use case of the communication apparatus 100 according to the embodiment of the present disclosure.

FIG. 5B is an explanatory diagram illustrating an example of a use case of the communication apparatus 100 according to the embodiment of the present disclosure.

DESCRIPTION OF EMBODIMENT

A preferred embodiment of the present disclosure will be described in detail below with reference to the attached drawings. Note that, in the present specification and drawings, constituent elements having substantially the same functional configuration are denoted by the same reference signs to omit overlapping description.

Note that the description will be given in the following order.

1. Embodiment of Present Disclosure
   1.1. Example of Appearance of Communication Apparatus
   1.2. Example of Configuration of Communication Apparatus
   1.3. Example of Operation of Communication Apparatus
2. Conclusion

1. EMBODIMENT OF PRESENT DISCLOSURE

[1.1. Example of Appearance of Communication Apparatus]

First, an example of an appearance of a communication apparatus according to an embodiment of the present disclosure will be described with reference to the drawings. FIGS. 1A, 1B, 1C, 1D, 1E, and 1F are explanatory diagrams depicting an example of an appearance of a communication apparatus 100 according to the embodiment of the present disclosure. The communication apparatus 100 illustrated in FIGS. 1A, 1B, 1C, 1D, 1E, and 1F are small wireless communication apparatus having a cellular communication function and has sensors mounted therein. Examples of the sensors mounted in the communication apparatus 100 may include an acceleration sensor, a gyro sensor, an electronic compass, an atmospheric sensor, a humidity sensor, a temperature sensor, a location information sensor, a heartbeat sensor, and a microphone. Note that the sensors listed here are mere examples and the communication apparatus 100 may include sensors other than the abovementioned sensors or may not include all of the abovementioned sensors.

The communication apparatus 100 according to the embodiment of the present disclosure is, for example, an apparatus expected to be held by such a user as a child or an elderly person and to be used to watch over the action of the user holding the apparatus. Thus, the communication apparatus 100 according to the embodiment of the present disclosure is formed as a small and light apparatus so as not to cause any burden on such a user who holds the apparatus.

Figure 1A:
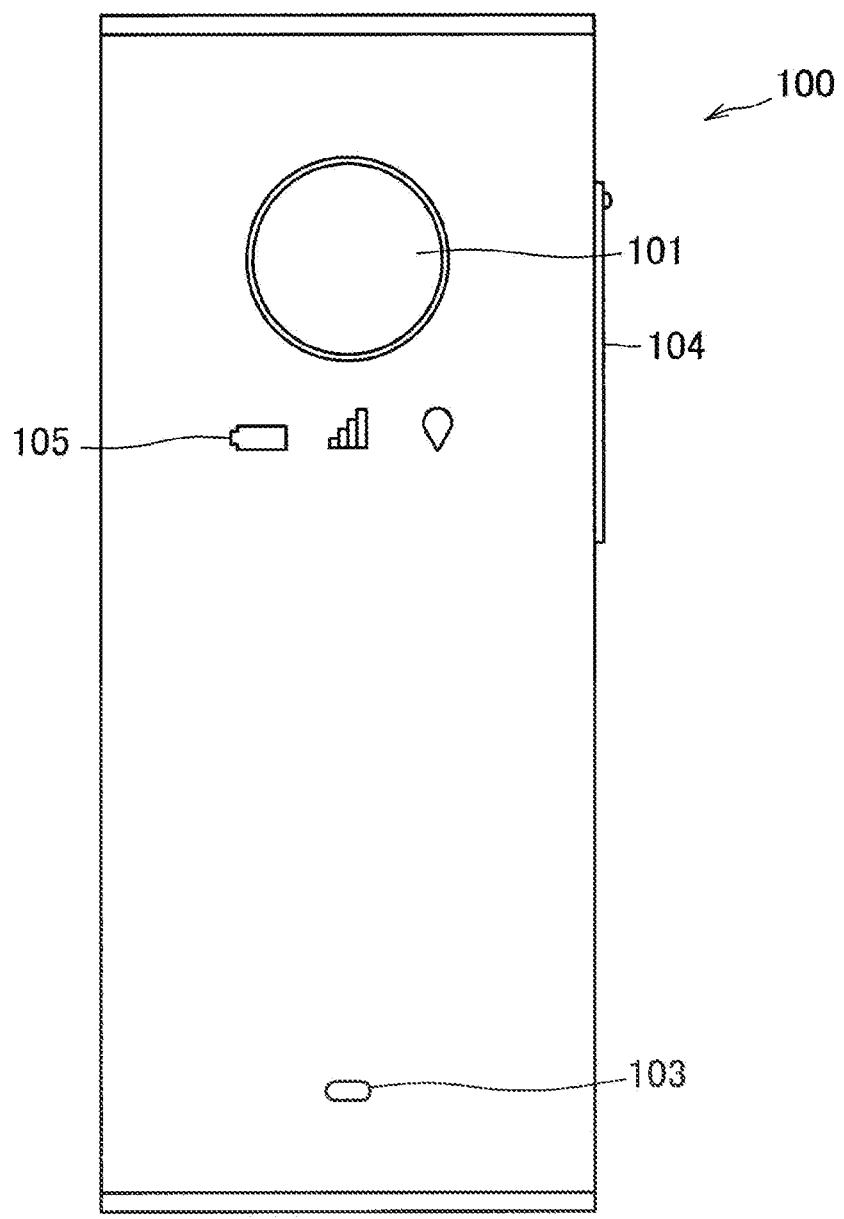
FIG. 1A is an explanatory diagram illustrating an example of an appearance of a communication apparatus 100 according to an embodiment of the present disclosure.
Figure 1C:
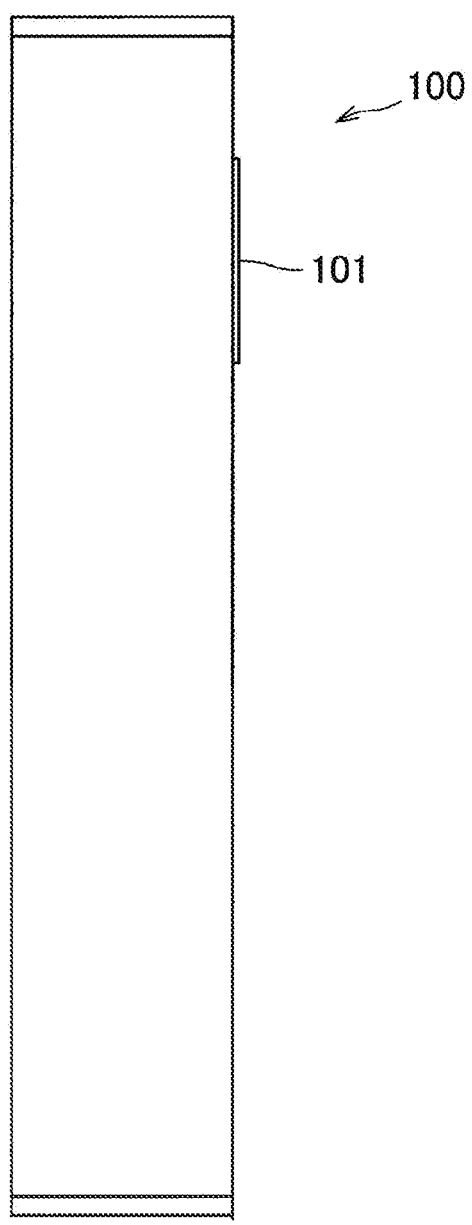
FIG. 1C is an explanatory diagram illustrating an example of the appearance of the communication apparatus 100 according to the embodiment of the present disclosure.
Figure 1D:
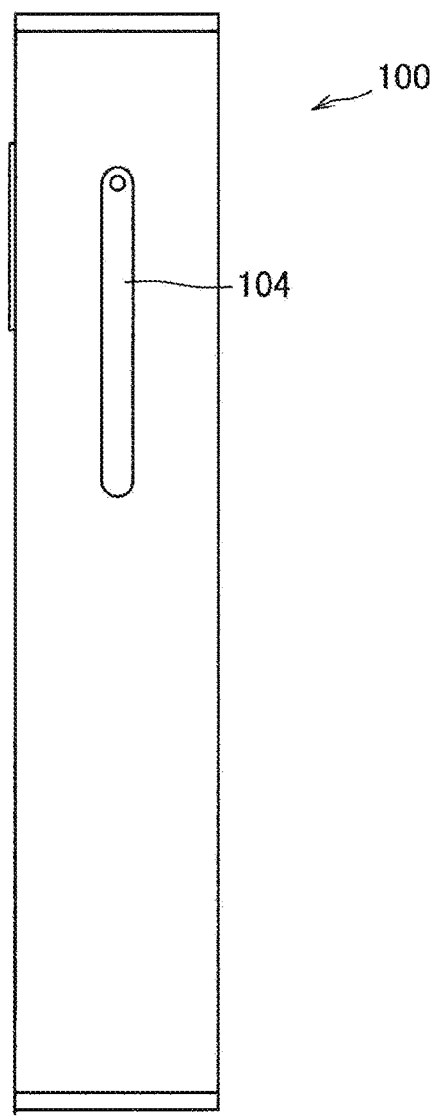
FIG. 1D is an explanatory diagram illustrating an example of the appearance of the communication apparatus 100 according to the embodiment of the present disclosure.
Figure 1E:
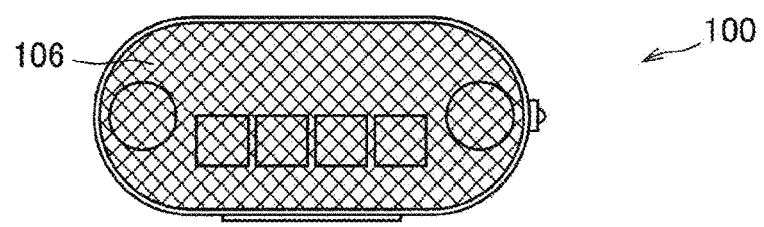
FIG. 1E is an explanatory diagram illustrating an example of the appearance of the communication apparatus 100 according to the embodiment of the present disclosure.
Figure 1F:
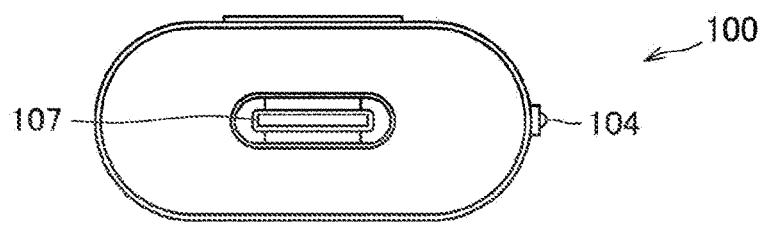
FIG. 1F is an explanatory diagram illustrating an example of the appearance of the communication apparatus 100 according to the embodiment of the present disclosure.

FIG. 1A is a front view of the communication apparatus 100 according to the embodiment of the present disclosure. FIG. 1B is a back view of the communication apparatus 100 according to the embodiment of the present disclosure. FIG. 1C is a left-side view of the communication apparatus 100 according to the embodiment of the present disclosure. FIG. 1D is a right-side view of the communication apparatus 100 according to the embodiment of the present disclosure. FIG. 1E is a top view of the communication apparatus 100 according to the embodiment of the present disclosure. FIG. 1F is a bottom view of the communication apparatus 100 according to the embodiment of the present disclosure.

The communication apparatus 100 includes a main button 101, an LED indicator 102, a microphone hole 103, a sound volume operation button 104, a strap hole 105, a speaker 106, and a USB connector 107.

The main button 101 is a button used to turn on or off power of the communication apparatus 100. The LED indicator 102 is an indicator used for indicating a state of the communication apparatus 100 and indicates remaining battery charge, radio field intensity for cellular communication, and whether or not sensing is performed by the location information sensor.

The microphone hole 103 is a hole for collecting sound by a microphone mounted inside the communication apparatus 100. Note that, in the present embodiment, the microphone hole 103 also serves as a hole for the temperature sensor mounted inside the communication apparatus 100.

The sound volume operation button 104 is a button used for performing an operation regarding volume of sound output from the communication apparatus 100. The strap hole 105 is a hole used for attaching a strap to the communication apparatus 100. The speaker 106 is used to output sound from the communication apparatus 100. The USB connector 107 is a connector used for connecting a USB cable or an external device to the communication apparatus 100. In the present embodiment, the USB connector 107 is compliant with the USB Type C.

Figure 2A:
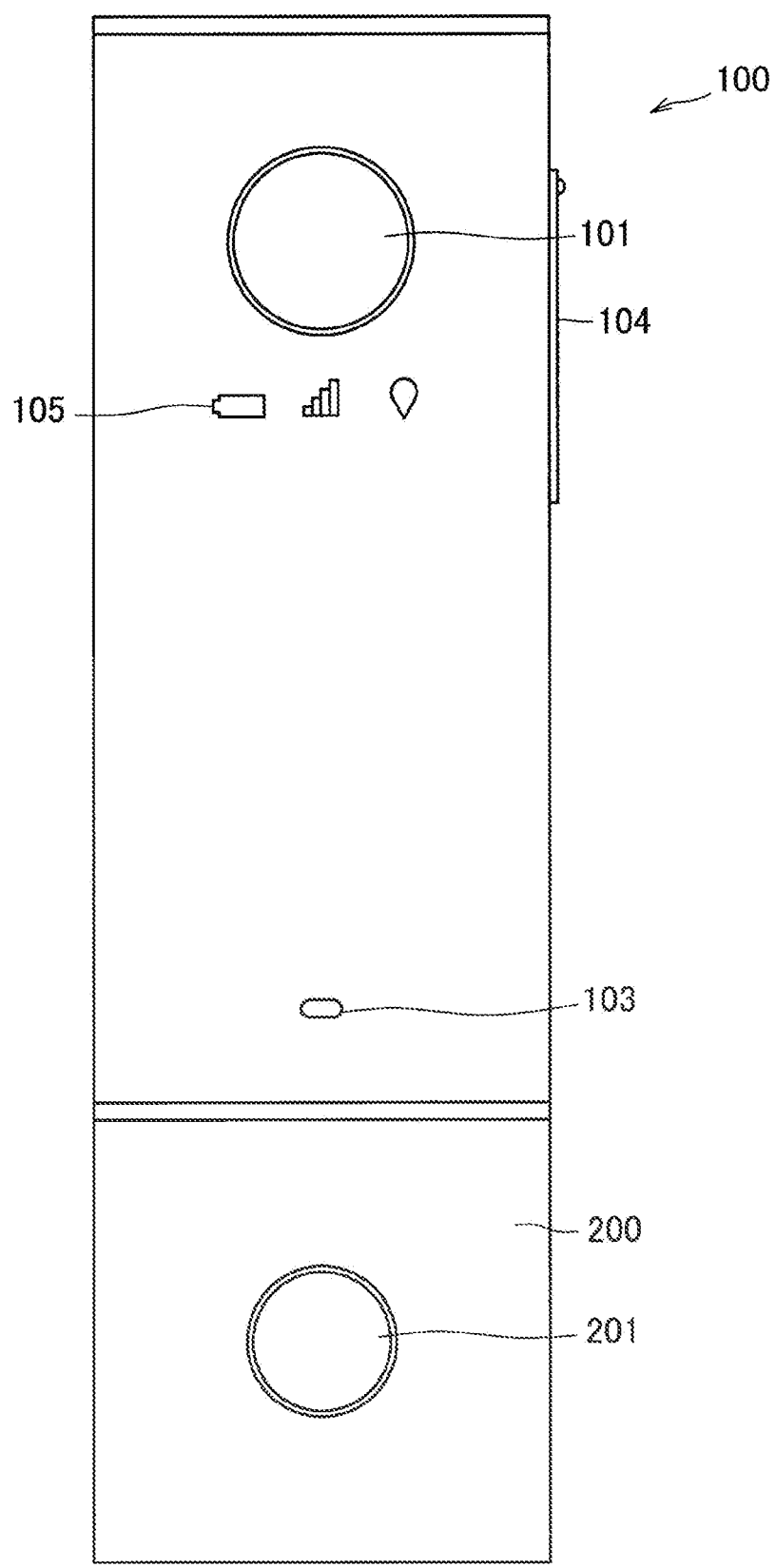
FIG. 2A is an explanatory diagram illustrating an example of the appearance of the communication apparatus 100 according to the embodiment of the present disclosure.
Figure 2B:
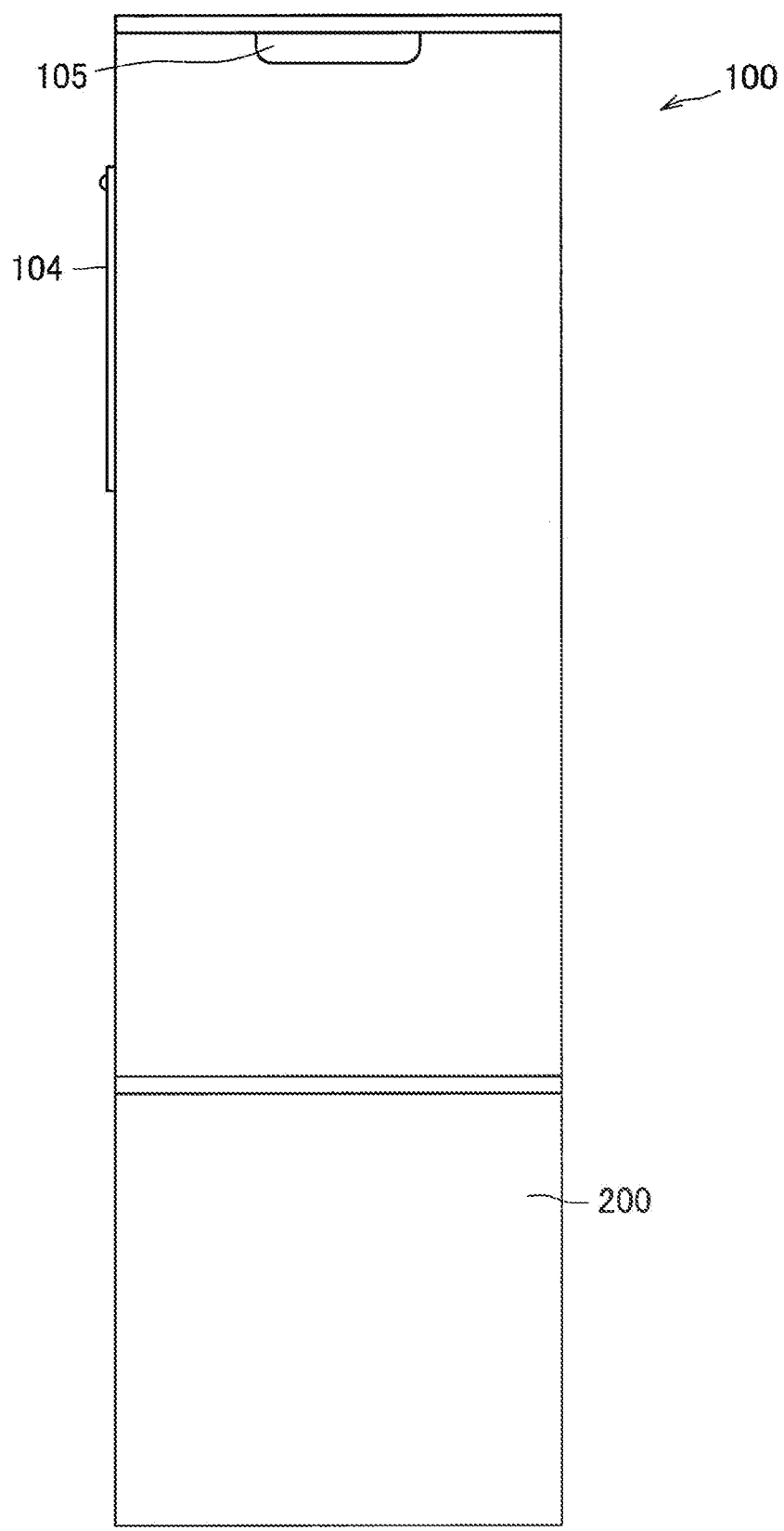
FIG. 2B is an explanatory diagram illustrating an example of the appearance of the communication apparatus 100 according to the embodiment of the present disclosure.
Figure 2C:
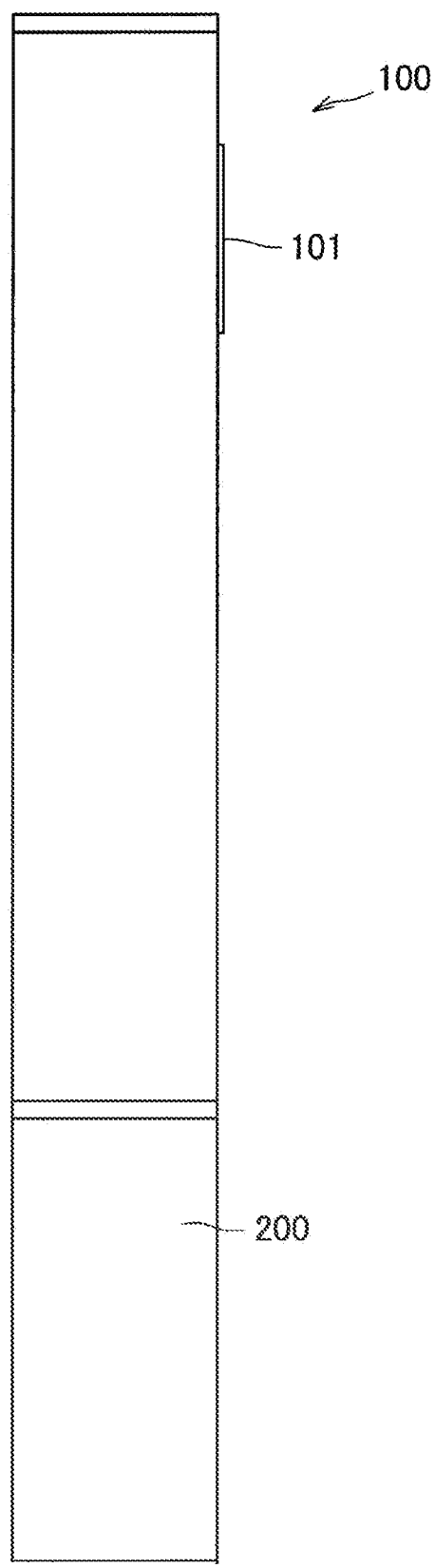
FIG. 2C is an explanatory diagram illustrating an example of the appearance of the communication apparatus 100 according to the embodiment of the present disclosure.
Figure 2D:
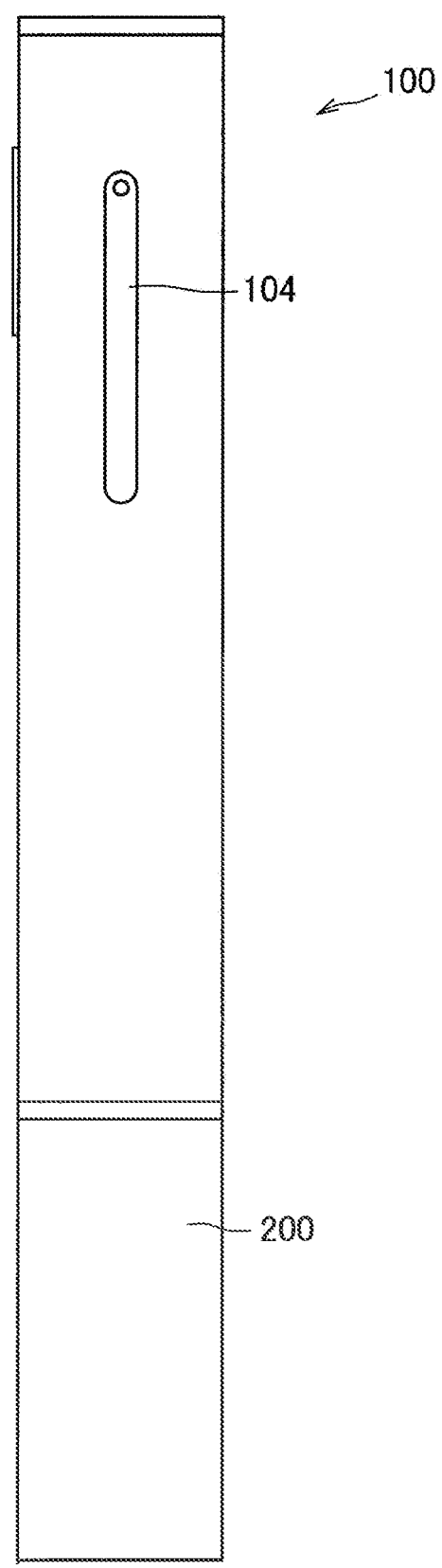
FIG. 2D is an explanatory diagram illustrating an example of the appearance of the communication apparatus 100 according to the embodiment of the present disclosure.
Figure 2E:
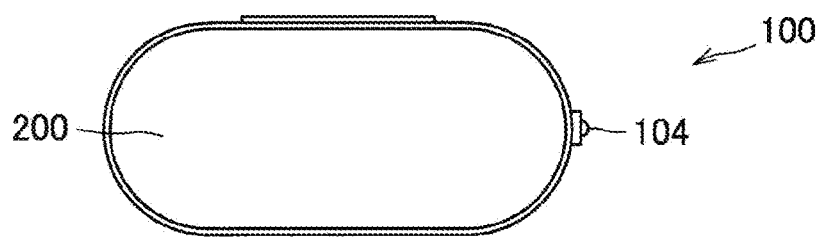
FIG. 2E is an explanatory diagram illustrating an example of the appearance of the communication apparatus 100 according to the embodiment of the present disclosure.

Examples of an external device that can be connected to the communication apparatus 100 may include a camera, a projector, an earphone jack conversion cable, a battery containing a secondary battery, and a solar battery that generates electricity by solar power or the like. FIGS. 2A, 2B, 2C, 2D, and 2E are explanatory diagrams illustrating a state in which a camera 200 as an external device is connected to the communication apparatus 100. FIG. 2A is a front view of the state in which the camera 200 is connected to the communication apparatus 100 according to the embodiment of the present disclosure. FIG. 2B is a back view of the state in which the camera 200 is connected to the communication apparatus 100 according to the embodiment of the present disclosure. FIG. 2C is a left-side view of the state in which the camera 200 is connected to the communication apparatus 100 according to the embodiment of the present disclosure. FIG. 2D is a right-side view of the state in which the camera 200 is connected to the communication apparatus 100 according to the embodiment of the present disclosure. FIG. 2E is a bottom view of the state in which the camera 200 is connected to the communication apparatus 100 according to the embodiment of the present disclosure.

[1.2. Example of Configuration of Communication Apparatus]

Figure 3:
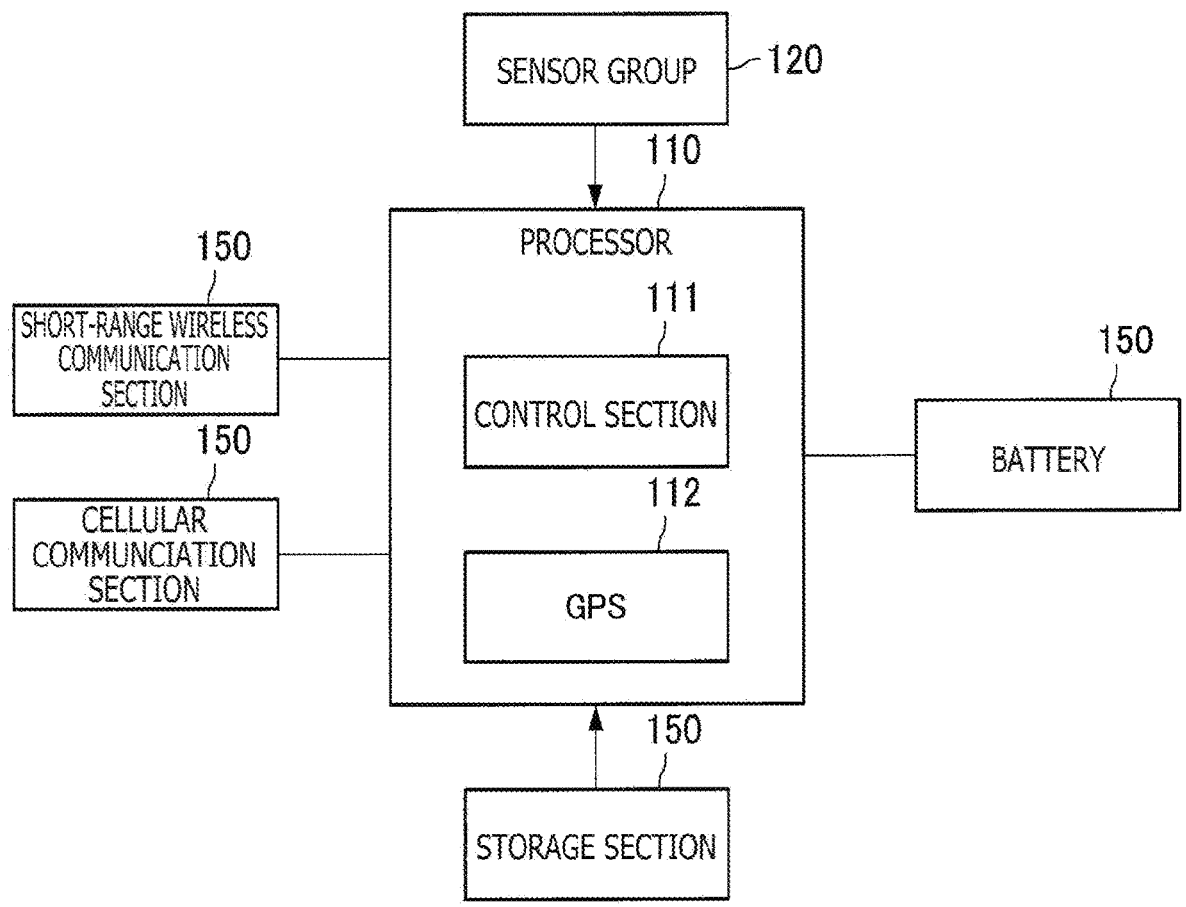
FIG. 3 is an explanatory diagram illustrating an example of a configuration of the communication apparatus 100 according to the embodiment of the present disclosure.

Next, an example of a configuration of the communication apparatus 100 according to the embodiment of the present disclosure will be explained. FIG. 3 is an explanatory diagram illustrating an example of the configuration of the communication apparatus 100 according to the embodiment of the present disclosure. In the following description, using FIG. 3, an example of the configuration of the communication apparatus 100 according to the embodiment of the present disclosure will be described.

As illustrated in FIG. 3, the communication apparatus 100 according to the embodiment of the present disclosure includes a processor 110, a sensor group 120, a short-range wireless communication section 130, a cellular communication section 140, a storage section 150, and a battery 160.

The processor 110 is hardware used for controlling an operation of the communication apparatus 100. In the present embodiment, a control section 111 and a GPS module 112 are included as functions of the processor 110.

The control section 111 controls the operation of the communication apparatus 100. Specifically, in the present embodiment, the control section 111 executes an operation of dynamically changing a discontinuous reception cycle in a discontinuous reception operation of the cellular communication section 140, according to environmental information, for example, sensing data transmitted from the sensor group 120, location information detected by the GPS module 112, a state of communication of the short-range wireless communication section 130, and the like. Specifically, the control section 111 analyzes in what kind of state the user holding the communication apparatus 100 is, by using such environmental information as sensing data, location information, and a state of communication of the short-range wireless communication section 130. The control section 111 then uses a result of such an analysis and executes the operation of dynamically changing the discontinuous reception cycle in the discontinuous reception operation of the cellular communication section 140.

While a specific use case will be described later, if a user of the communication apparatus 100 is identified to be at home from the sensing data, the location information, or the like, for example, the control section 111 sets the operation of the cellular communication section 140 to PSM (Power Saving Mode) or sets the operation of the cellular communication section 140 to eDRX (extended Discontinuous Reception), thereby being able to set a communication interval to be long. Further, for example, if the user of the communication apparatus 100 is identified to be at school from the sensing data, the location information, or the like, the control section 111 sets the operation of the cellular communication section 140 to eDRX and then sets the communication interval to be shorter than that in the case where the user is at home.

Here, in order to dynamically change the operation of the cellular communication section 140 on the basis of the location information, information regarding a place where the user is highly likely to be present, such as the user's home or school, may preliminarily be stored in advance in the storage section 150. Further, by machine learning or the like, the control section 111 may determine that the place where the user is most present during the daytime on weekdays is the school and the place where the user is present at times other than the above is the user's home.

The GPS module 112 is a location information sensor used to acquire a current location of the communication apparatus 100. Note that, while location information is being acquired by the GPS module 112, a lamp of the LED indicator 102 indicating that location information is being acquired is lighted.

The sensor group 120 includes the acceleration sensor, the gyro sensor, the electronic compass, the atmospheric sensor, the humidity sensor, the temperature sensor, the heartbeat sensor, the microphone, and the like, mentioned above. The pieces of sensing data acquired by each sensor included in the sensor group 120 are transmitted to the processor 110.

The short-range wireless communication section 130 includes a module that executes short-range wireless communication such as Wi-Fi, Bluetooth (registered trademark), and NFC (Near Field Communication). As described above, the state of communication of the short-range wireless communication section 130 is also used for changing the discontinuous reception cycle in the discontinuous reception operation of the cellular communication section 140.

The cellular communication section 140 includes a module that executes wireless communication based on such a standard as LTE (Long Term Evolution) or the succeeding system that is generally called 5G (fifth generation mobile communication system; 5th Generation). The cellular communication section 140 has such a function as the PSM or eDRX described above by which wireless communication can be executed with low power consumption.

The storage section 150 includes various kinds of memory modules and stores computer programs, setting information, and the like for operating the communication apparatus 100. The setting information to be stored in the storage section 150 may include, for example, information regarding a correspondence relation between the state of the user holding the communication apparatus 100 and the state to which the cellular communication section 140 is to be set. Further, the storage section 150 may temporarily store therein sensor data transmitted from the sensor group 120.

The battery 160 includes a rechargeable battery such as a lithium-ion secondary battery. As described above, the communication apparatus 100 according to the embodiment of the present disclosure is an apparatus expected to be held by such a user as a child or an elderly person and to be used to watch over the action of the user holding the apparatus. Thus, the battery 160 to be mounted in the communication apparatus 100 is also expected to be small, making it difficult to increase the capacity of the battery 160. Accordingly, the communication apparatus 100 according to the embodiment of the present disclosure executes control to reduce power consumption of the cellular communication section 140, as necessary.

The control section 111 may also take into consideration the situation of the SOC (State of Charge) of the battery 160 at the time of dynamically controlling the operation of the cellular communication section 140 according to the state of the user holding the communication apparatus 100. Specifically, even if the state of the user remains the same, if the SOC of the battery 160 is below a predetermined threshold, the control section 111 may make the discontinuous reception cycle longer.

An example of the configuration of the communication apparatus 100 according to the embodiment of the present disclosure has been described above with reference to FIG. 3. In the following description, an example of an operation of the communication apparatus 100 according to the embodiment of the present disclosure will be explained.

[1.3. Example of Operation of Communication Apparatus]

FIG. 4 is a flowchart illustrating an example of an operation of the communication apparatus 100 according to the embodiment of the present disclosure. Illustrated in FIG. 4 is an example of the operation of the communication apparatus 100 that is performed at the time of executing control for reducing the power consumption of the cellular communication section 140. In the following description, using FIG. 4, an example of the operation of the communication apparatus 100 according to the embodiment of the present disclosure will be described.

The communication apparatus 100 according to the embodiment of the present disclosure acquires sensor data (step S101). The sensor data here is transmitted from the sensor group 120 or the short-range wireless communication section 130. In addition, as sensor data, the situation of SOC of the battery 160 may be acquired.

Next, the communication apparatus 100 according to the embodiment of the present disclosure executes analysis of an action on the basis of the acquired sensor data (step S102). The processing in step S102 can be executed by the control section 111.

Subsequently, the communication apparatus 100 according to the embodiment of the present disclosure changes an interval period of communication of the cellular communication section 140, on the basis of a result of the analysis (step S103). The processing in step S103 can be executed by the control section 111.

Executing such an operation, the communication apparatus 100 according to the embodiment of the present disclosure can dynamically change the interval period of communication of the cellular communication section 140 on the basis of sensor data.

Here, an example of a use case of the communication apparatus 100 according to the embodiment of the present disclosure will be illustrated. FIGS. 5A and 5B are explanatory diagrams illustrating an example of a use case of the communication apparatus 100 according to the embodiment of the present disclosure. Illustrated here is an example of a use case where a parent has a child hold the communication apparatus 100 and watches over actions of the child. In this case, the user of the communication apparatus 100 is the child who is to be watched over.

At 6:30, the child wakes up. The communication apparatus 100 is in a state of being connected to a smartphone of the parent through Bluetooth. Further, the communication apparatus 100 determines, by the GPS module 112, that the communication apparatus 100 itself is located at the child's home. In addition, at that point of time, the communication apparatus 100 determines, by analyzing the sensor data, that the child is not making any action and is staying on site (Stay). Thus, the communication apparatus 100 sets a mode of the cellular communication section 140 to PSM and reduces the power consumption of the cellular communication section 140.

At 7:00, the child eats breakfast. The communication apparatus 100 is in the state of being connected to the parent's smartphone through Bluetooth. Further, the communication apparatus 100 determines, by the GPS module 112, that the communication apparatus 100 itself is located at the child's home. In addition, at that point of time, the communication apparatus 100 determines, by analyzing the sensor data, that the child is making small actions but is basically staying on site (Stay acc). Thus, the communication apparatus 100 sets the mode of the cellular communication section 140 to PSM and reduces the power consumption of the cellular communication section 140.

At 8:00, the child leaves his/her home and goes to school with his/her father. The communication apparatus 100 is not in the state of being connected to the parent's smartphone through Bluetooth. In addition, at that point of time, the communication apparatus 100 determines, by analyzing the sensor data, that the child is on a train. Thus, the communication apparatus 100 sets the mode of the cellular communication section 140 to normal (Connected).

At 8:30, the child arrives at school and takes classes. The communication apparatus 100 is not in the state of being connected to the parent's smartphone through Bluetooth. Further, the communication apparatus 100 determines, by the GPS module 112, that the communication apparatus 100 itself is located at the school. In addition, at that point of time, the communication apparatus 100 determines, by analyzing the sensor data, that the child is making small actions but is basically staying on site (Stay acc). Thus, the communication apparatus 100 sets the mode of the cellular communication section 140 to eDRX and sets a discontinuous reception cycle to be substantially moderate (mid).

At 11:30, the child temporarily leaves the school and goes on a picnic. The communication apparatus 100 is not in the state of being connected to the parent's smartphone through Bluetooth. Further, the communication apparatus 100 determines, by the GPS module 112, that the communication apparatus 100 itself is located at a park. In addition, at that point of time, the communication apparatus 100 determines, by analyzing the sensor data, that the child is walking (Walk). Thus, the communication apparatus 100 sets the mode of the cellular communication section 140 to a normal communication state (Connected).

At 14:00, the child goes back to school and takes classes. The communication apparatus 100 is not in the state of being connected to the parent's smartphone through Bluetooth. In addition, the communication apparatus 100 determines, by the GPS module 112, that the communication apparatus 100 itself is located at the school. Further, at that point of time, the communication apparatus 100 determines, by analyzing the sensor data, that the child is making small actions but is basically staying on site (Stay acc). Thus, the communication apparatus 100 sets the mode of the cellular communication section 140 to eDRX and sets the discontinuous reception cycle to be substantially short (short).

At 16:00, though done with classes, the child stays at school and engages in activities. The communication apparatus 100 is not in the state of being connected to the parent's smartphone through Bluetooth. In addition, the communication apparatus 100 determines, by the GPS module 112, that the communication apparatus 100 itself is located at the school. Further, at that point of time, the communication apparatus 100 determines, by analyzing the sensor data, that the child is walking (Walk). Thus, the communication apparatus 100 sets the mode of the cellular communication section 140 to eDRX and sets the discontinuous reception cycle to be substantially short (short).

At 18:00, the child's father comes to the school by car to pick up the child. The communication apparatus 100 is not in the state of being connected to the parent's smartphone through Bluetooth. In addition, at that point of time, the communication apparatus 100 determines, by analyzing the sensor data, that the child is riding in the car. Thus, the communication apparatus 100 sets the mode of the cellular communication section 140 to the normal communication state (Connected).

At 18:30, the child gets back home. The communication apparatus 100 is in the state of being connected to the parent's smartphone through Bluetooth. In addition, the communication apparatus 100 determines, by the GPS module 112, that the communication apparatus 100 itself is located at the child's home. Further, at that point of time, the communication apparatus 100 determines, by analyzing the sensor data, that the child is making small actions but is basically staying on site (Stay acc). Thus, the communication apparatus 100 sets the mode of the cellular communication section 140 to eDRX and sets the discontinuous reception cycle to be substantially long (long).

Thereafter, the child takes dinner at home, spends his/her time reading books, for example, and goes to bed at 21:30. During that period of time, determining that the state of the child holding the communication apparatus 100 does not change, the communication apparatus 100 sets the mode of the cellular communication section 140 to eDRX and sets the discontinuous reception cycle to be substantially long (long).

As described above, in the case where the user of the communication apparatus 100 is a child, the communication apparatus 100 performs control in such a manner that the power consumption of the cellular communication section 140 is reduced in a case where the user is in his/her home or at school and that the cellular communication section 140 is allowed to perform a reception operation on a frequent basis in a case where the user is present in places other than the above. As a result, the communication apparatus 100 according to the embodiment of the present disclosure is able to perform a communication operation in a timely manner in a case where there occurs any necessity to watch over the action of the user, while reducing power consumption as a whole.

Another use case will be described. The communication apparatus 100 may be used for watching over an elderly person. In a case of this use case, the user of the communication apparatus 100 is the elderly person who is to be watched over.

In a case where, as a result of an analysis using sensor data or location information, the user of the communication apparatus 100 is determined to be staying home and resting, the communication apparatus 100 reduces the power consumption of the cellular communication section 140, as in the abovementioned use case example. In addition, in a case where, as a result of an analysis using the sensor data or location information, the user of the communication apparatus 100 is determined to have left home, the communication apparatus 100 sets the state of the cellular communication section 140 to the normal communication state (Connected).

In the case where the user of the communication apparatus 100 is an elderly person, the elderly person may go to the hospital on a regular basis. Taking into consideration of such a case, in a case where, as a result of an analysis using the sensor data or location information, the user of the communication apparatus 100 is determined to be at the hospital, the communication apparatus 100 sets the mode of the cellular communication section 140 to eDRX and sets the discontinuous reception cycle to be substantially in a range from a moderate- to a long-cycle length. The communication apparatus 100 may determine whether the user is at the hospital, through, for example, connection to a wireless LAN or Bluetooth installed in the hospital, in addition to using the location information or instead of using the location information.

Further, there may be a case where the user of the communication apparatus 100 is an elderly person who is hospitalized and the communication apparatus 100 is used to watch over the elderly person. In this case, in a case where, as a result of an analysis using the sensor data or location information, the user of the communication apparatus 100 is determined to be in a hospital ward, the communication apparatus 100 sets the mode of the cellular communication section 140 to PSM, and in a case where, as a result of an analysis using the sensor data or location information, the user of the communication apparatus 100 is determined to have left the hospital ward, the communication apparatus 100 sets the mode of the cellular communication section 140 to eDRX and sets the discontinuous reception cycle to be substantially short.

Further, there may be cases where the communication apparatus 100 is used for watching over pets such as dogs and cats or for conducting an ecology survey on such animals as turtles and hawks. In this case, in a case where, as a result of an analysis using the sensor data or location information, the communication apparatus 100 is determined to be located at a predetermined position, the communication apparatus 100 sets the mode of the cellular communication section 140 to PSM, and in a case where, as a result of an analysis using the sensor data or location information, the communication apparatus 100 is determined to be located away from the predetermined position, the communication apparatus 100 sets the mode of the cellular communication section 140 to eDRX and sets the discontinuous reception cycle to be substantially in a range from a moderate- to a long-cycle length.

As described above, the communication apparatus 100 according to the embodiment of the present disclosure dynamically changes the state of the cellular communication section 140 on the basis of the sensor data output from the sensor group 120 included in the communication apparatus 100, the state of communication of the short-range wireless communication section 130, and the current location information obtained by the GPS module 112. Specifically, if the communication apparatus 100 is identified to be located at a safe place such as the home, the communication apparatus 100 can set the state of the cellular communication section 140 to eDRX and make the discontinuous reception cycle longer or set the state of the cellular communication section 140 to PSM so as to reduce the power consumption of the cellular communication section 140.

As described above, a difference in the user of the communication apparatus 100 leads to a difference in the type of sensing data to be used. Thus, the control section 111 may decide the sensing data to be used with priority for determining the action of the user, depending on the user for whom the communication apparatus 100 is used. Further, the difference in the user of the communication apparatus 100 leads to a difference in the place where the discontinuous reception cycle is to be changed. Thus, the control section 111 may decide the place where the discontinuous reception cycle is to be changed, depending on the user for whom the communication apparatus 100 is used.

In the abovementioned use case example, the communication apparatus 100 is held by a person and the action of the person holding the communication apparatus 100 is watched over. Yet, the present disclosure is not limited to such an example. For example, the communication apparatus 100 may be attached, for example, to a package to be shipped out from a warehouse, a truck on which the package is to be loaded, or the like and be used for tracking the package, the truck, or the like. For example, if the package is identified to be located in a warehouse from the location information, the communication apparatus 100 may set the state of the cellular communication section 140 to PSM, and if the package is identified to have left the warehouse and to be in transit from the location information, the communication apparatus 100 may set the state of the cellular communication section 140 to the normal communication state or set the state of the cellular communication section 140 to eDRX and set the discontinuous reception cycle to be substantially in a range from a moderate- to a long-cycle length.

Further, the communication apparatus 100 according to the embodiment of the present disclosure can also be used for watching over expensive packages. In a case where Bluetooth connection is established between the communication apparatus 100 and a smartphone of an owner of a package, the communication apparatus 100 sets the mode of the cellular communication section 140 to PSM. On the other hand, in a case where the communication apparatus 100 has moved away from the smartphone of the owner of the package, Bluetooth connection is no longer established between the communication apparatus 100 and the smartphone of the owner of the package, and the location information changes over time, the communication apparatus 100 the communication apparatus 100 may set the state of the cellular communication section 140 to the normal communication state or set the state of the cellular communication section 140 to eDRX and make the discontinuous reception cycle substantially short.

As described above, the communication apparatus 100 according to the embodiment of the present disclosure can connect an external device to the USB connector 107. The communication apparatus 100 according to the embodiment of the present disclosure may set the state of the cellular communication section 140 to eDRX and make the discontinuous reception cycle longer or set the state of the cellular communication section 140 to PSM, according to the type of the device connected to the USB connector 107.

As described above, the communication apparatus 100 according to the embodiment of the present disclosure analyzes the action of the user of the communication apparatus 100, by analyzing the sensing data from the sensor group 120. At the time of such an analysis, the communication apparatus 100 may also use data stored in a cloud server. By using the data stored in a cloud server, the communication apparatus 100 according to the embodiment of the present disclosure can analyze the action of the user of the communication apparatus 100 more accurately.

2. CONCLUSION

As explained above, the embodiment of the present disclosure provides the communication apparatus 100 that is capable of dynamically changing the discontinuous reception cycle of the cellular communication section 140, on the basis of such environmental information as sensing data and location information. By dynamically changing the discontinuous reception cycle of the cellular communication section 140 on the basis of such environmental information as sensing data and location information as described above, the communication apparatus 100 according to the embodiment of the present disclosure can reduce the amount of power consumption of the cellular communication section 140. Thus, the communication apparatus 100 according to the embodiment of the present disclosure can incorporate a battery that is small in size and capacity, realizing a small and light apparatus.

The steps in the processes to be executed by the apparatuses in the present specification are not necessarily required to be processed in the time series following the order described in the sequence diagram or the flowchart. For example, the steps in the processes to be executed by the apparatuses may be processed in an order different from the order described in the flowchart or may be processed in parallel.

Further, a computer program for causing such hardware as a CPU, a ROM, and a RAM incorporated in the apparatuses to exert functions equivalent to those of the components of the apparatuses described above can also be created. Moreover, a storage medium in which the computer program is stored can also be provided. Furthermore, the series of processes can be implemented by hardware, by constituting each of the functional blocks depicted in the functional block diagram by hardware.

While a preferred embodiment of the present disclosure has been described above in detail with reference to the attached drawings, the technical scope of the present disclosure is not limited to such an example. It is obvious that any person who has ordinary knowledge in the technical field to which the present disclosure belongs can conceive of various changes and modifications within the technical idea stated in the claims, and it should be understood that these changes and modifications naturally fall within the technical scope of the present disclosure.

Further, the advantageous effects described in the present specification are explanatory or exemplary to the last and not limitative. That is, the technology according to the present disclosure may produce, in addition to the abovementioned effects or in place of the abovementioned effects, other effects that are obvious to those skilled in the art from the descriptions in the present specification.

Note that the following configurations also fall within the technical scope of the present disclosure.

(1)
A communication apparatus including:
a wireless communication section configured to execute wireless communication with an outside; and
a control section configured to acquire environmental information including sensing data output from a sensor group and to dynamically control, on the basis of the environmental information, an interval of the wireless communication performed by the wireless communication section with the outside.

(2)
The communication apparatus according to (1) above, in which the control section analyzes an action of a user from the sensing data and dynamically controls, on the basis of a result of the analysis, the interval of the wireless communication performed by the wireless communication section with the outside.

(3)
The communication apparatus according to (1) or (2) above, in which the environmental information includes location information, and
the control section dynamically controls, on the basis of the location information, the interval of the wireless communication performed by the wireless communication section with the outside.

(4)
The communication apparatus according to (3) above, in which, determining, from the location information, that the communication apparatus has left an area determined in advance, the control section performs control to make the interval of the wireless communication performed by the wireless communication section with the outside shorter than that in a case where the communication apparatus is in the area.

(5)
The communication apparatus according to any one of (1) to (4) above, in which the environmental information includes information regarding a state of short-range wireless communication, and
the control section dynamically controls, on the basis of the information regarding the state of the short-range wireless communication, the interval of the wireless communication performed by the wireless communication section with the outside.

(6)
The communication apparatus according to (5) above, in which, determining, from the environmental information, that the communication apparatus is in a state of being connected to another apparatus by the short-range wireless communication, the control section performs control to make the interval of the wireless communication performed by the wireless communication section with the outside longer than that in a case where the communication apparatus is not connected to the other apparatus.

(7)
The communication apparatus according to any one of (1) to (6) above, in which the control section changes a setting of the interval of the wireless communication performed by the wireless communication section with the outside, according to an attribute of a user.

(8)
The communication apparatus according to any one of (1) to (7) above, in which the control section uses PSM (Power Saving Mode) or eDRX (extended Discontinuous Reception) to change the setting of the interval of the wireless communication performed by the wireless communication section with the outside.

(9)
A communication control method including:
by a processor,
executing wireless communication with an outside; and
acquiring environmental information including sensing data output from a sensor group and dynamically controlling, on the basis of the environmental information, an interval of the wireless communication with the outside.

(10)
A computer program causing a computer to:
execute wireless communication with an outside; and
acquire environmental information including sensing data output from a sensor group and dynamically control, on the basis of the environmental information, an interval of the wireless communication with the outside.

REFERENCE SIGNS LIST

100: Communication apparatus
101: Main button
102: LED indicator
103: Microphone hole
104: Sound volume operation button
105: Strap hole
106: Speaker
107: USB connector

The invention claimed is:

1. A communication apparatus, comprising:
at least one processor configured to:
communicate wirelessly with an external apparatus;
acquire environmental information including sensing data output from a sensor group, wherein the environmental information includes location information;
determine the communication apparatus has left a specific area based on the location information;
set an operation mode for the wireless communication; and
dynamically control, based on the determination that the communication apparatus has left the specific area, an interval of the wireless communication such that a first communication interval of the wireless communication in the selected operation mode is shorter than a second communication interval of the wireless communication in the selected operation mode, wherein
the first communication interval is for the wireless communication performed when the communication apparatus has left the specific area, and
the second communication interval is for the wireless communication performed when the communication apparatus is in the specific area.

2. The communication apparatus according to claim 1, wherein the at least one processor is further configured to:
analyze a state of a user from the sensing data and
dynamically control, based on a result of the analysis, the interval of the wireless communication.

3. The communication apparatus according to claim 1, wherein
the environmental information further includes information associated with a state of short-range wireless communication with the external apparatus, and
the at least one processor is further configured to dynamically control, based on the information associated with the state of the short-range wireless communication, the interval of the wireless communication.

4. The communication apparatus according to claim 3, wherein the at least one processor is further configured to:
determine, based on the environmental information, that the communication apparatus is in a state of being connected to the external apparatus by the short-range wireless communication,
control the interval of the wireless communication such that a third communication interval of the wireless communication when the communication apparatus is connected to the external apparatus is longer than a fourth communication interval of the wireless communication when the communication apparatus is not connected to the external apparatus.

5. The communication apparatus according to claim 1, wherein the at least one processor is further configured to change a setting of the interval of the wireless communication based on an attribute of a user.

6. The communication apparatus according to claim 1, wherein
the at least one processor is further configured to user one of a PSM (Power Saving Mode) or eDRX (extended Discontinuous Reception) to change a setting of the interval of the wireless communication, and
the selected operation mode comprises one of the PSM or eDRX.

7. A communication control method, comprising:
by a processor,
communicating wirelessly by a communication apparatus with an external apparatus;
acquiring environmental information including sensing data output from a sensor group, wherein the environmental information includes location information;
determining the communication apparatus has left a specific area based on the location information;
setting an operation mode for the wireless communication; and
dynamically controlling, based on the determination that the communication apparatus has left the specific area, an interval of the wireless communication to make a first communication interval of the wireless communication in the selected operation mode shorter than a second communication interval of the wireless communication in the selected operation mode, wherein
the first communication interval is for the wireless communication performed when the communication apparatus has left the specific area, and
the second communication interval is for the wireless communication performed when the communication apparatus is in the specific area.

8. A non-transitory computer-readable medium having stored thereon, computer-executable instructions which, when executed by a computer, cause the computer to execute operations, the operations comprising:
communicating wirelessly by a communication apparatus with an external apparatus;
acquiring environmental information including sensing data output from a sensor group, wherein the environmental information includes location information;
determining the communication apparatus has left a specific area based on the location information;
setting an operation mode for the wireless communication; and
dynamically controlling, based on the determination that the communication apparatus has left the specific area, an interval of the wireless communication to make a first communication interval of the wireless communication in the selected operation mode shorter than a second communication interval of the wireless communication in the selected operation mode, wherein
the first communication interval is for the wireless communication performed when the communication apparatus has left the specific area, and
the second communication interval is for the wireless communication performed when the communication apparatus is in the specific area.

* * * * *